No. 769,924. PATENTED SEPT. 13, 1904.
A. STUCKI.
TANK CAR.
APPLICATION FILED SEPT. 19, 1903.
NO MODEL. 6 SHEETS—SHEET 2.

Witnesses:
Inventor:
Attorneys.

No. 769,924. PATENTED SEPT. 13, 1904.
A. STUCKI.
TANK CAR.
APPLICATION FILED SEPT. 19, 1903.
NO MODEL. 6 SHEETS—SHEET 3.

Witnesses: Inventor;

No. 769,924. PATENTED SEPT. 13, 1904.
A. STUCKI.
TANK CAR.
APPLICATION FILED SEPT. 19, 1903.
NO MODEL. 6 SHEETS—SHEET 4.

Witnesses:
Inventor;
By
Attorneys.

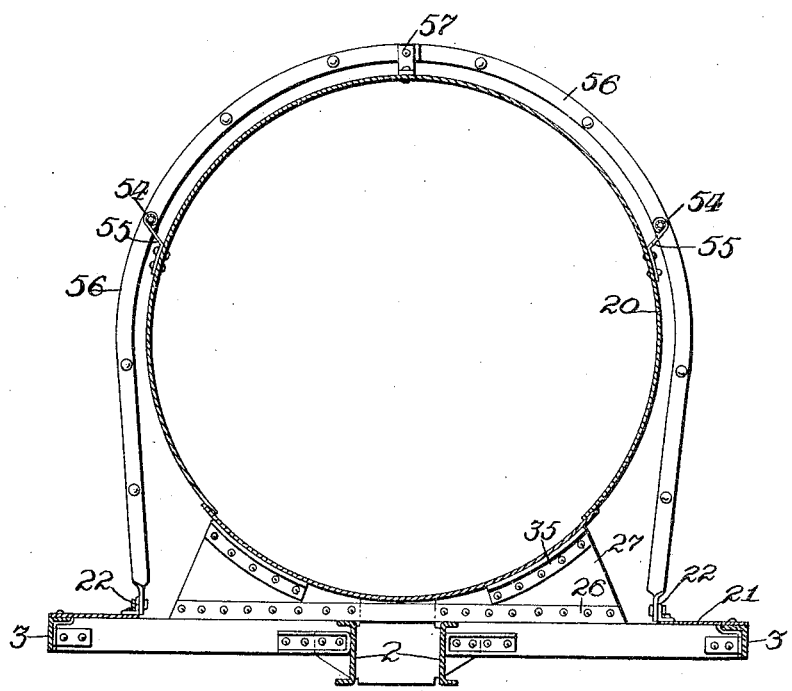

No. 769,924. PATENTED SEPT. 13, 1904.
A. STUCKI.
TANK CAR.
APPLICATION FILED SEPT. 19, 1903.
NO MODEL. 6 SHEETS—SHEET 6.
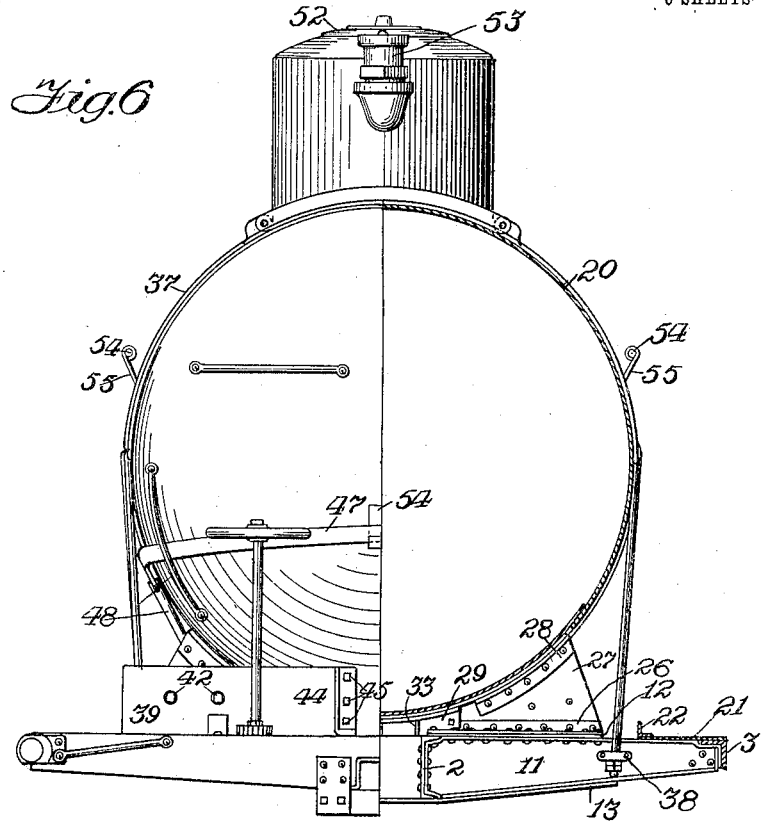
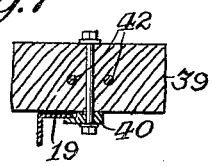 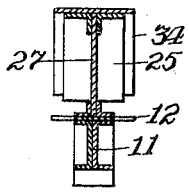 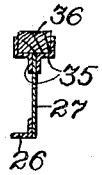 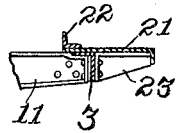
Witnesses:
Robt. C. Totten
J. R. Keller
Inventor,
Arnold Stucki
By Kay, Totten & Winter
Attorneys.

No. 769,924.

Patented September 13, 1904.

UNITED STATES PATENT OFFICE.

ARNOLD STUCKI, OF ALLEGHENY, PENNSYLVANIA, ASSIGNOR TO STANDARD STEEL CAR CO., OF PITTSBURG, PENNSYLVANIA, A CORPORATION OF PENNSYLVANIA.

TANK-CAR.

SPECIFICATION forming part of Letters Patent No. 769,924, dated September 13, 1904.

Application filed September 19, 1903. Serial No. 173,832. (No model.)

*To all whom it may concern:*

Be it known that I, ARNOLD STUCKI, a resident of Allegheny, in the county of Allegheny and State of Pennsylvania, have invented a new and useful Improvement in Tank-Cars; and I do hereby declare the following to be a full, clear, and exact description thereof.

My invention relates to tank-cars; and the object is to provide a car of this description having a minimum weight for the carrying capacity of the car and provided with improved adjustable means for preventing endwise movement of the tank on the car and, in general, improved details of construction, as will hereinafter be described and claimed.

Figure 1:
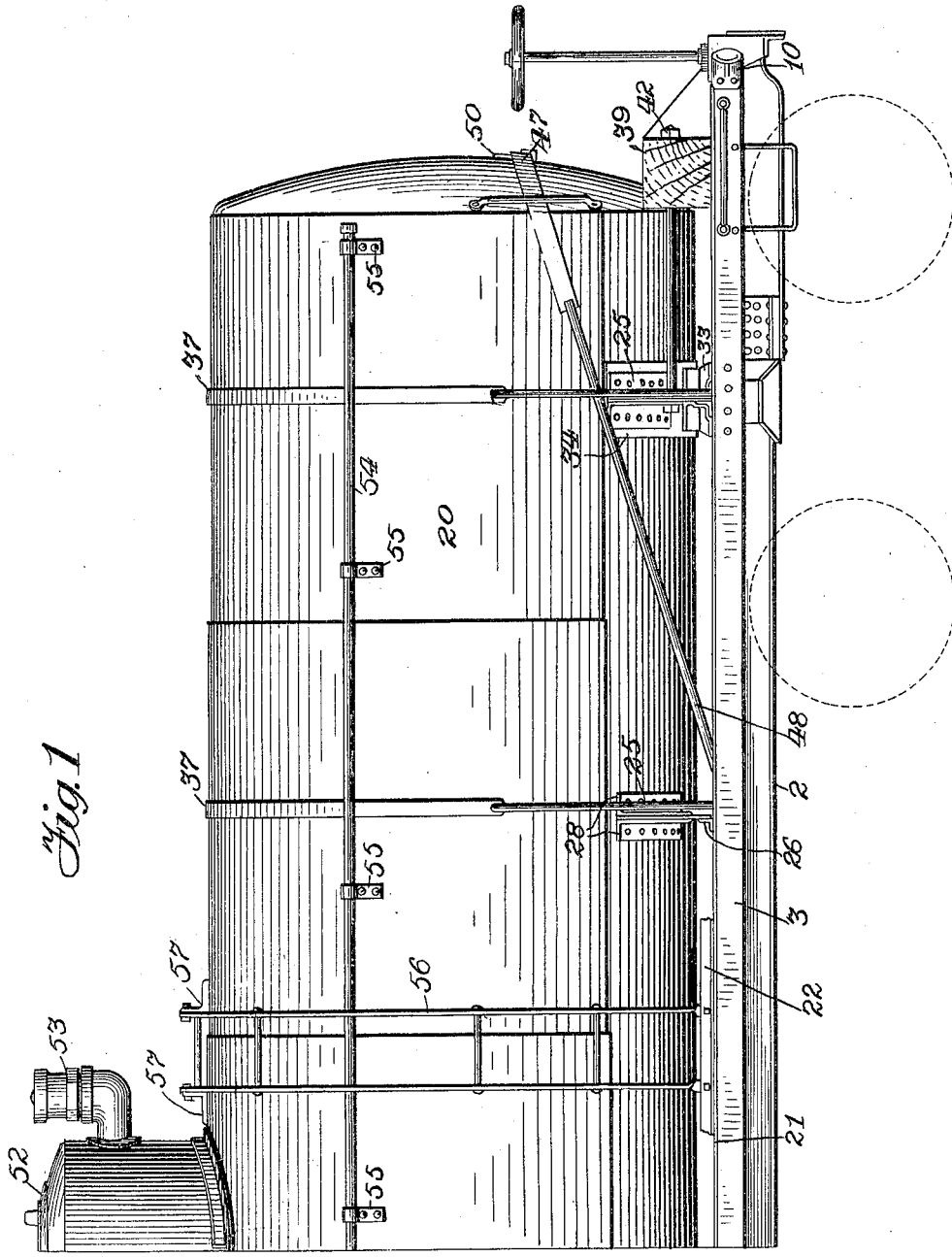
Figure 2:
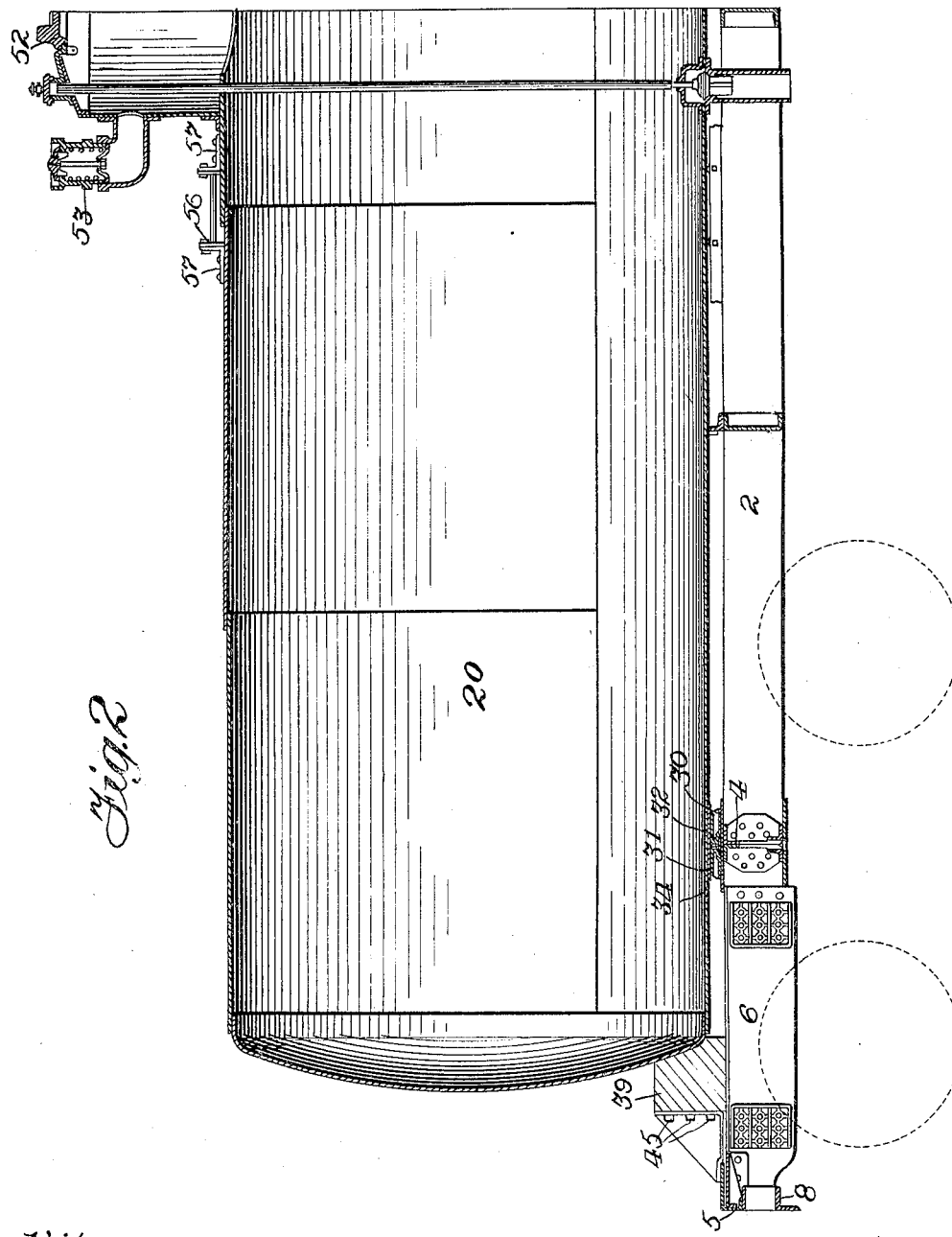
Figure 3:
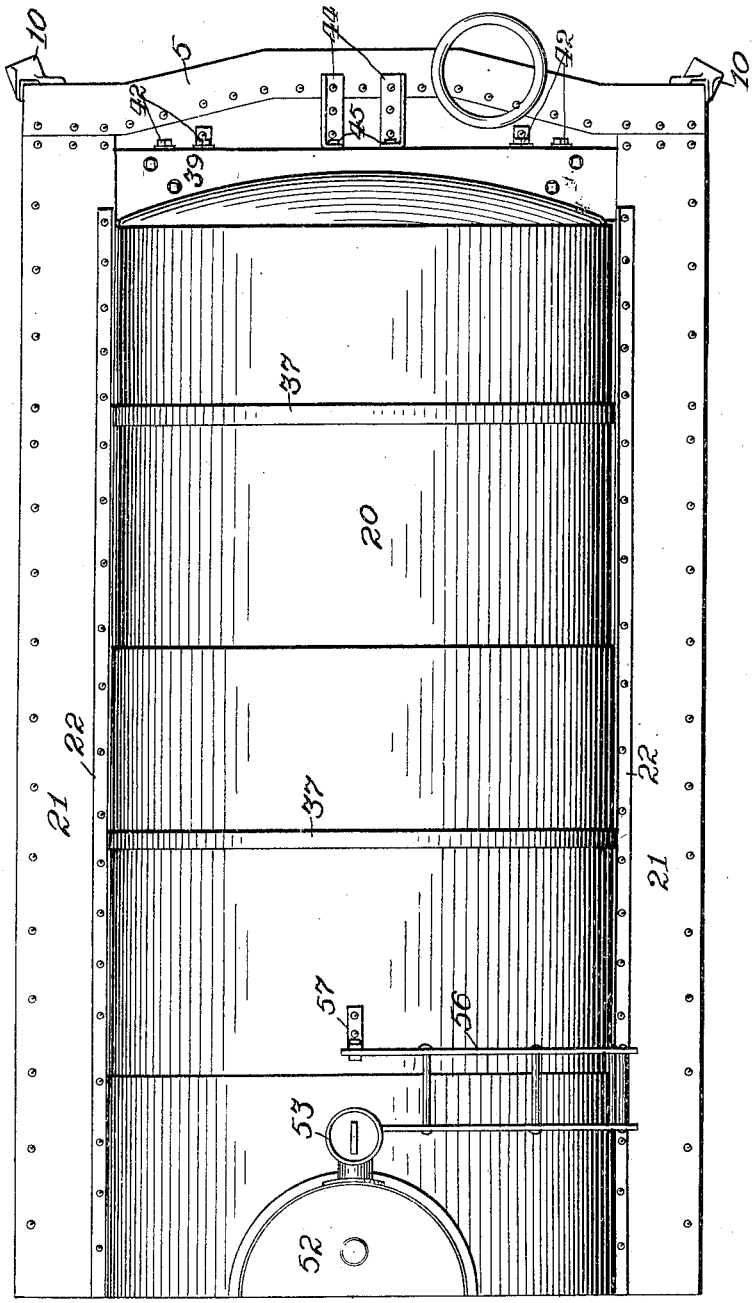
Figure 4:
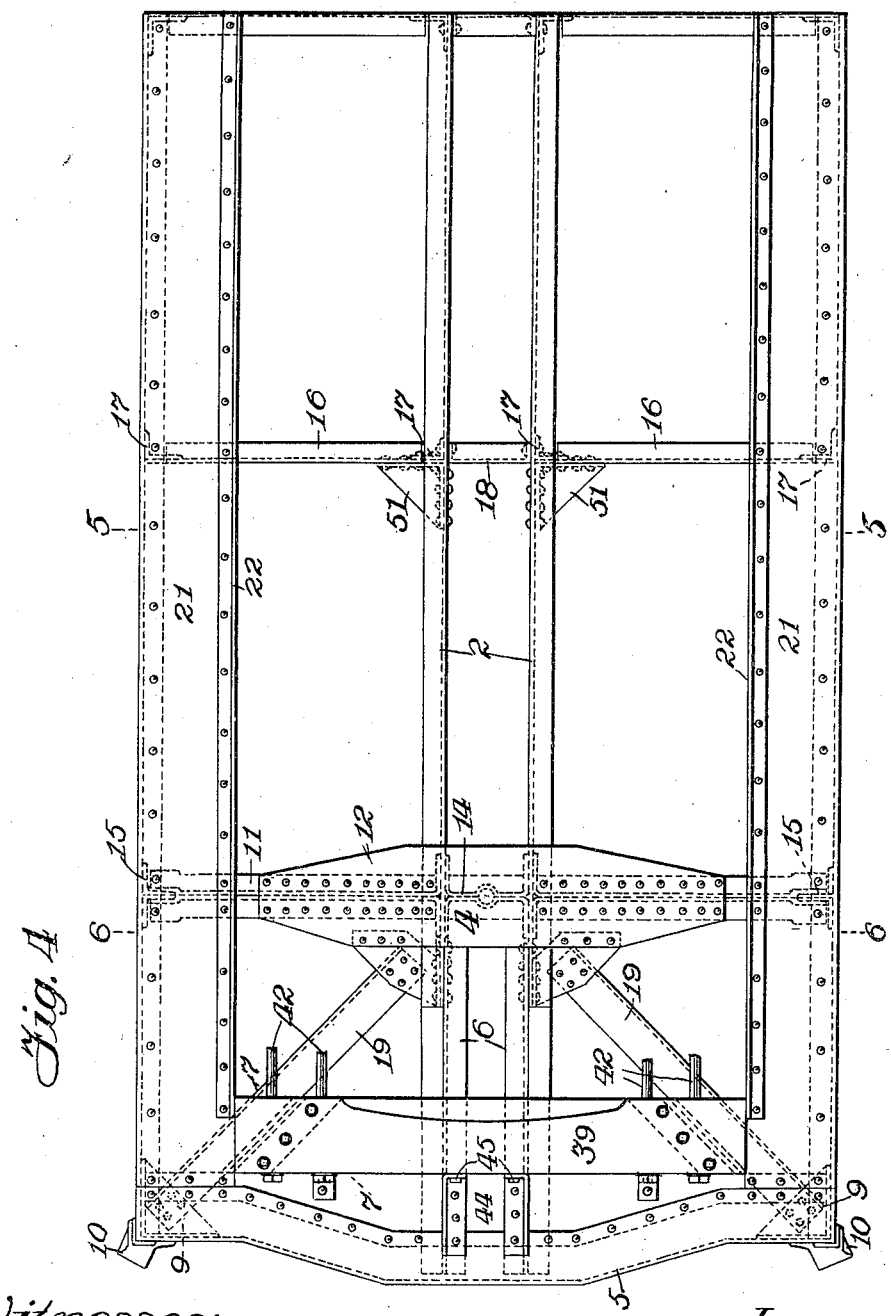

In the accompanying drawings, Figure 1 is a side view of one half of my tank-car. Fig. 2 is a vertical longitudinal section through the other half of the car. Fig. 3 is a plan view of one half of the car. Fig. 4 is a plan view of the underframe of the other half of the car, the tank and the saddles for supporting it being removed. Fig. 5 is a transverse section on the line 5 5, Fig. 4. Fig. 6 on its left-hand side is an end view and on its right-hand side a transverse section on the line 6 6, Fig. 4. Fig. 7 is a section on the line 7 7, Fig. 4. Fig. 8 is a transverse section through one of the saddles and the body-bolster. Fig. 9 is a section through one of the saddles, showing a modification; and Fig. 10 shows the running-board for very large tanks.

The underframe of my car comprises center sills 2, side sills 3, body-bolsters 4, end sills 5, draft-sills 6, and transverse cross ties or connectors intermediate the body-bolsters. The center sills preferably will be rolled channel-beams placed with their flanges projecting outwardly. The side sills 3 will be formed of some small flanged bar, such as the angle-bars shown. The end sills 5 are shown as plates pressed into channel shape somewhat deeper at the middle than near the ends and also preferably bowed outwardly near the center, as shown in plan view. These end sills are notched at the center for the passage of the draw-bar shank, and underneath said notch is supported the draw-bar carrier 8. These end sills will be secured to the side sills by any convenient means, such as the gusset-plates 9, and the corners are reinforced by the push-pole pockets 10.

The draft-sills 6 are sections of flanged bar, preferably pressed Z-bars, and are secured to the ends of the center sills outside of the body-bolsters. Their outer ends are secured to the end sills by any suitable connecting means. The body-bolsters are also of an old design, being formed of web members 11, formed of pressed plates with flanges on their top and bottom sides and inner ends and extending from the center sills to the side sills, two such members being placed back to back. The web members on opposite sides of the car are connected by the top cover-plate 12, riveted to the upper flanges thereof and extending over the center sills. A bottom cover-plate or connecting member 13 extends underneath the center sills and is riveted to the lower flanges of the web members of the body-bolster. Between the center sills is placed a brace 14, which may be of the usual or any preferred type. The web members 11 are secured to the center sills by rivets passing through the flanges on their inner ends and are secured to the side sills by short pieces of angle-iron 15, riveted between the spread-apart ends of said web members and to the center sills.

The cross-connecting members intermediate the body-bolsters comprise sections of flanged bar 16, preferably angle-bars with unequal legs placed with the wide leg vertical, these members being connected to the side and center sills by short pieces of angle-iron 17. Between the center sills, in line with these cross-ties 16, are transverse connecting-pieces 18, preferably formed of a plate notched out at the four corners and having flanges pressed on all four sides, the flanges on two of the sides serving as a means for riveting the same to the center sills. Diagonal braces 19 extend from the corners of the car to the junction of the body-bolsters and center sills, being connected at both ends by means of suitable connection-plates.

The tank is shown at 20, and this is or may be of the usual construction. This tank is much stiffer and stronger than the car-underframe itself, and hence the underframe is not designed to carry any of the load except at the body-bolsters. The center sills are merely intended to take the buffing strains and will be only strong enough to perform this function, while the side sills serve only as a support for the running-board, and consequently are made very light, as shown. The body-bolster also is shorter than on other cars, as the load is carried entirely at the center, the projecting ends of the body-bolster outside the side bearings merely serving as brackets to support the running-board.

The running-boards are each formed of a plate 21, supported on the outer ends of the body-bolsters and cross-connectors and on top of the side sill, being riveted to the side sill and having its inner edge stiffened by means of an angle-bar 22 riveted thereto. On higher-capacity cars the tank will naturally be of increased diameter, and in order to give sufficient room for the trainmen to pass the running-board will project beyond the side sills, as shown in Fig. 10, and the projecting portion will be supported by brackets 23, riveted to the side sills.

The tank is supported over the body-bolsters and also over the cross-connectors by saddles 25. The saddles over the cross-connectors are formed of sections of angle-bar 26, resting upon the underframe and extending across the same above the center sills. To the vertical legs of these angle-bars are riveted segmental-shaped web-plates 27, one plate on each side of the car, which project upwardly and have their upper edges curved to the contour of the tank. If desired, a single plate might be used extending entirely across the car over the center sills. To the upper edges of these plates are riveted curved sections of angle-bar 28, one on each side of the plate, with their horizontal legs projecting in opposite directions and forming the support for the tank.

At the body-bolsters the saddles are formed substantially the same as just described, with the modification that the bearing-surface between the saddles and the tank has been materially increased, this being necessary because the entire load of the tank and its contents is carried by the body-bolster saddles. This increase of bearing is secured by placing castings 29 between the body-bolster and the tank partly across the car, these castings being of saddle or segmental shape and extending some little distance each side of the center of the car, as shown in Fig. 6. Each casting is formed of a bottom plate 30, resting on the body-bolster, a segmental top plate 31, upon which the tank rests, a vertical web 32, connecting the top and bottom plates, and short vertical webs 33, also connecting the top and bottom plates at intervals and extending at right angles to the vertical web 32. These castings are placed back to back, one on each side of the cross-bars 26. In order to prevent the tank-plates becoming worn and weakened at the body-bolster saddles, I rivet to said tank a wearing-plate 34, which rests upon the saddles and takes all the wear.

In case it is desired to have a wooden bearing in the saddles the latter may be formed, as shown in Fig. 9, by means of sections of Z-bar 35, riveted to the vertical web-plates 27, thus providing a channel or groove in which the wooden bearing-block 36 is placed.

The tank is held down upon the underframe by means of bands 37, passing over the tank and having their ends secured to brackets 38 on the body-bolsters and cross-ties. Endwise movement of the tank is prevented by means of wooden blocks 39, which have their ends cut off about in line with the tank, so as not to obstruct free access to the running-boards. These blocks are secured to the underframe, but in such a manner that they may be adjusted longitudinally thereof. They are kept from rising from the underframe by means of clips 40, secured to the lower face thereof and having a projecting portion extending underneath the diagonal braces 19, sufficient clearance being left between the braces and the bent portion of these clips, so that the blocks can be moved longitudinally of the underframe. Near the ends of each block are two tie rods or bolts 42, which pass through holes formed in the web members of the body-bolster saddles. One or both ends of these rods are provided with nuts, by means of which the blocks may be drawn up tightly against the end of the tank, thus making said blocks adjustable and reducing the cost of fitting up the car considerably. At their central portions the blocks are braced by means of pressed or cast brackets 44, which are secured to the underframe in any suitable manner, such as by means of rivets, and are secured to the blocks by means of lag-screws 45. When the blocks are drawn toward the tank, these lag-screws are taken out and liner-plates, perforated with holes to aline with the holes through the brackets 44, are slipped between said brackets and the blocks and then the lag-screws are again inserted.

As a further aid in preventing endwise movement of the tank I use a restraining-band 47, passing around the end of the tank and preferably bent to the contour of the tank end, said band having connected to its ends the tie-rods 48, which extend downwardly diagonally and are passed through holes in the cross-connectors 16 and through castings having an inclined bearing-seat. The ends of these rods are fitted with nuts, by means of which the rods can be put under tension. To prevent the restraining-band 47 from falling down, I rivet to the end of the tank a stirrup or bracket 50, in which said restraining-band rests. This restraining-band is located quite low down on the tank, so that the tie-rods 48 will not project beyond the tank, so as not to obstruct the passage on the running-board, and also so that said tie-rods will not form an objectionably large angle with reference to the horizontal, thus making them very effective. The cross-connectors 16, through which the ends of the tie-rods are passed, are braced by triangular brackets 51, riveted thereto and to the center sills.

The tank will be provided with the usual dome 52, having thereon the safety-valves 53 and other tank-fixtures to suit the requirements of the user. A hand-rail 54 is secured to the sides of the tank by means of brackets 55. Two ladders 56 are shown, one at each end of the dome, these ladders having their lower ends riveted or bolted to the angle-bars 21 of the running-boards and curving upwardly over the tank and having their upper ends secured to brackets 57, riveted to the top of the tank. The grab-irons, steps, or other parts of the car may be of any desirable type and will be varied to suit the requirements or convenience of the user.

What I claim is—

1. In a tank-car, the combination of center sills, end sills, body-bolsters and transverse connecting members intermediate the body-bolsters, a tank supported on said underframe, a plate supported on the projecting ends of the body-bolsters and transverse connectors, a flanged bar riveted to the inner edge of said plate, and a ladder having its lower end secured to said flanged bar and its upper end secured to the top of the tank.

2. A tank-car having an underframe comprising longitudinal sills, body-bolsters and cross-connecting members intermediate the body-bolsters, a tank supported on said underframe, and a restraining-band extending across the end of said tank, tie-rods connected to said restraining-band and secured to cross-connecting members of the underframe, and braces in the angles formed by said cross-connecting members with the underframe.

3. In a tank-car, the combination of an underframe comprising center and side sills, body-bolsters and transverse connecting members intermediate the body-bolsters, a tank supported on said underframe, diagonally-arranged braces between some of said transverse connecting members and the center sills, tie-rods having one end secured to said cross-connecting members and having their opposite ends secured to the ends of the tank.

4. In a tank-car, the combination of an underframe, saddles thereon, a tank supported on the saddles, blocks on the underframe at the ends of the tank, and adjusting-bolts connecting said blocks and the saddles.

5. In a tank-car, the combination of the underframe, a tank supported on the underframe, blocks supported on the underframe at the ends of the tank, adjustable means for securing said blocks to the underframe, and bracing-brackets outside of said blocks and secured to the underframe.

6. In a tank-car, the combination of an underframe, a tank supported thereon, blocks on the underframe at the ends of the tank, clips secured to said blocks and projecting under a portion of the underframe, and means for adjusting said blocks longitudinally of the underframe.

7. In a tank-car, the combination of an underframe comprising longitudinal sills, end sills, body-bolsters and diagonal braces extending from the body-bolsters to the corners of the car, a tank supported on said underframe, blocks on the underframe at the ends of the tank, clips secured to said blocks and projecting under the diagonal braces, and means for adjusting said blocks longitudinally of the underframe.

8. In a tank-car, the combination of an underframe, saddles supported thereby, a tank resting in said saddles, and a wear-plate secured to said tank at the point where it rests in said saddles.

In testimony whereof I, the said ARNOLD STUCKI, have hereunto set my hand.

ARNOLD STUCKI.

Witnesses:
ROBERT C. TOTTEN,
G. KREMER.